G. W. Clark.
Grain Drill.
Nº 29,057. Patented Jul. 10, 1860.
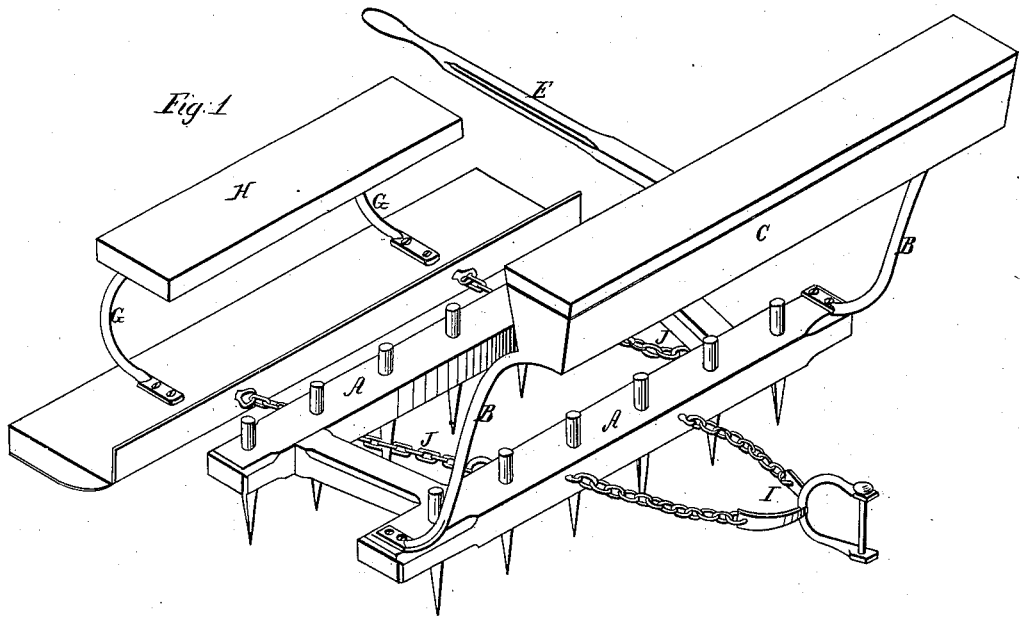
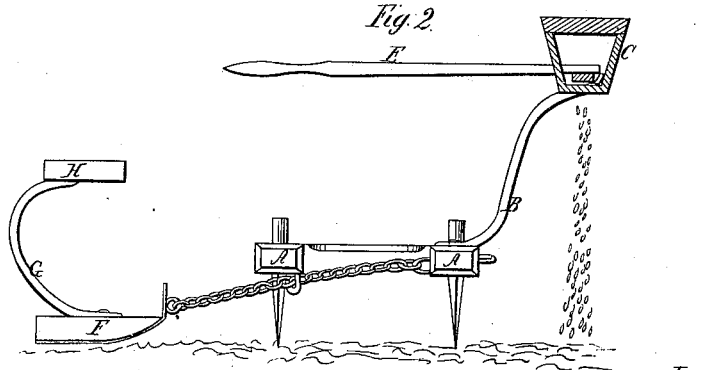
Witnesses:
John W. Clute
Wm Yorker A Lee
Inventor,
Knight Brothers Attorneys
for G. W. Clark.

UNITED STATES PATENT OFFICE.

GEORGE W. CLARK, MOUNT WASHINGTON, OHIO.

IMPROVEMENT IN SEEDING-MACHINES.

Specification forming part of Letters Patent No. 29,057, dated July 10, 1860.

*To all whom it may concern:*

Be it known that I, GEORGE W. CLARK, of Mount Washington, Hamilton county, Ohio, have invented an Improved Combination of Seed-Planter, Harrow, and Clod-Crusher; and I hereby declare the following to be a full and exact description of the same, reference being had to the accompanying drawings, in which—

Figure 1 is a perspective view of the implement, and Fig. 2 a side elevation of the same, partly in section.

A represents a harrow, from the front part of the frame of which project upward and forward two standards, B, affording rigid support to a seed-box, C. D is a slide in the said box, operated by hand by means of a lever, E, as hereinafter explained.

F is a clod-crushing drag, consisting of a heavy plank beveled in front on its under surface, as shown, and shod with iron.

G are standards rising from the drag F, and supporting a driver's seat, H.

I represent draft-chains and clevis, to which the team is hitched.

J are chains connecting the drag F with the harrow A.

The operation is as follows: The driver, being seated upon the seat H, governs the team with one hand, and with the other operates the slide D by means of the lever E, so as to drop seed with any desired rapidity as the machine is drawn forward. The harrow, following immediately, covers the seed, and the drag F, succeeding it, operates to effectually pulverize the soil and compact it about the seed.

A very simple, economical, and effective seeding implement is thus provided, which dispenses with the use of wheels, the whole weight of the machine and driver being applied to the operations of harrowing and crushing clods.

I claim as new and of my invention herein—

The combination of the harrow A, seed-box C, and drag F, constructed, combined, and operating in the manner and for the purposes set forth.

In testimony of which invention I hereunto set my hand.

GEORGE W. CLARK.

Witnesses:
 GEO. H. KNIGHT,
 FRANCIS MILLWARD.